(12) United States Patent
Huang et al.

(10) Patent No.: US 9,933,873 B2
(45) Date of Patent: Apr. 3, 2018

(54) ARRAY SUBSTRATE, TOUCH DISPLAY, AND ELECTRONIC DEVICE

(71) Applicant: Wuhan China Star Optoelectronics Technology Co., Ltd., Wuhan, Hubei (CN)

(72) Inventors: Yao-li Huang, Guangdong (CN); Hongsen Zhang, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 77 days.

(21) Appl. No.: 15/126,397

(22) PCT Filed: Jul. 20, 2016

(86) PCT No.: PCT/CN2016/090608
§ 371 (c)(1),
(2) Date: Sep. 15, 2016

(87) PCT Pub. No.: WO2018/000480
PCT Pub. Date: Jan. 4, 2018

(65) Prior Publication Data
US 2018/0032184 A1 Feb. 1, 2018

(51) Int. Cl.
*G06F 3/041* (2006.01)
*G06F 3/044* (2006.01)
(Continued)

(52) U.S. Cl.
CPC ........ *G06F 3/0412* (2013.01); *G02F 1/13338* (2013.01); *G02F 1/134336* (2013.01);
(Continued)

(58) Field of Classification Search
CPC ......... G06F 3/044; G06F 3/0412; G06F 3/041
(Continued)

(56) References Cited

U.S. PATENT DOCUMENTS

| | | | |
|---|---|---|---|
| 2012/0313881 A1* | 12/2012 | Ge | G02F 1/13338 345/174 |
| 2016/0253023 A1* | 9/2016 | Aoyama | G06F 3/0416 345/174 |
| 2016/0291755 A1* | 10/2016 | Li | G06F 3/0412 |

FOREIGN PATENT DOCUMENTS

| | | |
|---|---|---|
| CN | 104536630 A | 4/2015 |
| CN | 104808885 A | 7/2015 |

* cited by examiner

*Primary Examiner* — Koosha Sharifi-Tafreshi
(74) *Attorney, Agent, or Firm* — Andrew C. Cheng

(57) ABSTRACT

An array substrate comprises a common electrode, an insulation layer, and a sensing layer, the common electrode comprises the touch electrodes, they are in spaced arrangement, the sensing layer comprises the touch traces and the suspending traces, the touch trace is disposed above the touch electrode and electrically connects to the touch electrode by the through hole, the suspending trace is disposed above the interval between two of the touch electrodes and electrically connects to the touch trace by the first trace. Using the electrical connection between the suspending trace and the touch trace, the electrical potentials of the suspending trace and the touch electrode are the same, the difference of the electric field between the interval area of the adjacent touch electrodes and the touch electrode decreases for avoiding the electric field formed in the data line under the touch electrode ingresses into the liquid crystal layer.

16 Claims, 3 Drawing Sheets

(51) Int. Cl.
*G02F 1/1343* (2006.01)
*G02F 1/1333* (2006.01)

(52) U.S. Cl.
CPC ............ *G06F 3/044* (2013.01); *G06F 3/0416* (2013.01); *G02F 1/133345* (2013.01); *G02F 2201/121* (2013.01)

(58) Field of Classification Search
USPC ................................................ 345/173, 174
See application file for complete search history.

ARRAY SUBSTRATE, TOUCH DISPLAY, AND ELECTRONIC DEVICE

CROSS REFERENCE

The present disclosure request for the priority of an earlier application of the application number 201610507016.0 of the disclosure name "Array Substrate, Touch Display, and Electronic Device" on Jun. 30, 2016. The earlier application content is quoted in the present disclosure.

FIELD OF THE INVENTION

The present disclosure relates to the touch display technology field, more specifically, to the array substrate, touch display and electronic device.

BACKGROUND OF THE INVENTION

With the intense competition of the smart phone market, a new round of the competition of the TDDI (Touch Display Driver Integration) product is coming. Incell technology is regarded as the high level technology, and widely followed. The incell technology means embedded the touch panel features into the liquid crystal pixels.

The current self-capacitance touch technical solution, the common electrode is separated to several sensors in matrix arrangement, the adjacent sensors of the plurality sensors exist the cut slits. When the electric field formed in the signal transmission of the data line passes through the sensors of the cut slits, it will affect the liquid crystal relative to the cut slits, and will interfere the liquid crystal steering to cause the leakage of light in the place. It will increase the risk of Mura and affect the optical performance of the incell touch display.

SUMMARY OF THE INVENTION

The purpose of the disclosure provides the array substrate, the substrate can reduce the risk of light leakage, and avoid the vertical linear wavy defect.

Another purpose of the disclosure provides the touch display used the array substrate.

Another purpose of the disclosure provides the electronic device used the array substrate.

To achieve the above object, the embodiment of the disclosure provides the technical solution as follows:

The disclosure provides the array substrate, comprising a common electrode, an insulation layer, and a sensing layer are sequentially stacked, the common electrode comprises a plurality of the touch electrodes, the plurality of the touch electrodes are arranged spatially, the sensing layer comprises a plurality of the touch traces and a plurality of the suspending traces, one of the touch trace is disposed above the touch electrode and electrically connects to the touch electrode by the through hole, one of the suspending trace is disposed above the interval between two of the touch electrodes and electrically connects to the touch trace by the first trace.

The plurality of touch electrodes are arranged in matrix, and each of the touch electrodes is arranged relative to the plurality of the touch traces and the suspending trace.

The plurality of the touch traces, with respect to the same touch electrode, are arranged in parallel to each other, and each of the touch traces is electrically connected to the touch electrode by the plurality of through holes.

The extending direction of the touch trace and the extending direction of the suspending trace are the same.

The plurality of the suspending traces are insulated from each other.

The present disclosure comprises the touch driving unit and the second trace, each touch electrode connects to the touch driving unit by the touch trace.

Each of the touch electrodes is arranged relative to the plurality of touch traces, at least two of the touch traces electrically connect to the second trace.

The touch driving unit supplies the stable voltage signal to the touch trace and the suspending trace, the stable voltage signal is the standard pulse signal supplied in the touch period.

The disclosure provides the touch displays, comprising the array substrate, the array substrate comprising a common electrode, an insulation layer, and a sensing layer are sequentially stacked, the common electrode comprises a plurality of the touch electrodes, the plurality of the touch electrodes are arranged spatially, the sensing layer comprises a plurality of the touch traces and a plurality of the suspending traces, the touch trace is disposed above the touch electrode and electrically connects to the touch electrode by the through hole, the suspending trace is disposed above the interval between two of the touch electrodes and electrically connects to the touch trace by the first trace.

The plurality of the touch electrodes are in matrix arrangement, and each of the touch electrodes is arranged relative to the plurality of the touch traces and the suspending trace.

The plurality of the touch traces relative to the touch electrode are juxtaposed, each of the touch electrode electrically connects to the touch electrode by the plurality of through holes.

The extending direction of the touch trace and the extending direction of the suspending trace are the same.

The plurality of the suspending traces are insulated each other.

The disclosure comprises the touch driving unit and the second trace, each touch electrode connects to the touch driving unit by the touch trace.

Wherein each of the touch electrodes is arranged relative to the plurality of touch traces, at least two of the touch traces electrically connect to the second trace.

The touch driving unit supplies the stable voltage signal to the touch trace and the suspending trace, the stable voltage signal is the standard pulse signal supplied in the touch period.

The disclosure provides the electronic device, comprising the touch display, the touch display comprising a common electrode, an insulation layer, and a sensing layer are sequentially stacked, the common electrode comprises a plurality of the touch electrodes, the plurality of the touch electrodes are arranged spatially, the sensing layer comprises a plurality of touch traces and a plurality of suspending traces, one of the touch trace is disposed above the touch electrode and electrically connects to the touch electrode by the through hole, one of the suspending trace is disposed above the interval between two of the touch electrodes and electrically connects to the touch trace by the first trace.

The plurality of the touch electrodes are arranged in matrix, and each of the touch electrodes is arranged relative to the plurality of the touch traces and the suspending trace.

The plurality of the touch traces, with respect to the same touch electrode, are arranged in parallel to each other, and each of the touch traces is electrically connected to the touch electrode by the plurality of through holes.

The embodiment of the disclosure has benefit or advantage as follows:

The disclosure uses the method of the electrical connection between the suspending trace and the touch trace, the electrical potentials of the suspending trace and the touch electrode are the same, the difference of the electric field between the interval area of the adjacent touch electrodes and the touch electrode is decreasing. Avoiding the electric field formed in the data line under the touch electrode ingresses into the liquid crystal layer, forming the electric field of the standard direction, driving the liquid crystal to steer, leading to the light leakage at the place, and occurring the vertical linear wavy Mura phenomenon.

BRIEF DESCRIPTION OF THE DRAWINGS

In order to clearly illustrate the embodiment of the disclosure or the technical solution of the current technology, the drawings illustrate the embodiments and the current technology, obviously the descriptions of the drawings are embodiments of the disclosure. According to the drawings, the person skilled in the art will obtain others without any creative efforts.

DETAILED DESCRIPTION OF THE PREFERRED EMBODIMENTS

Figure 1:
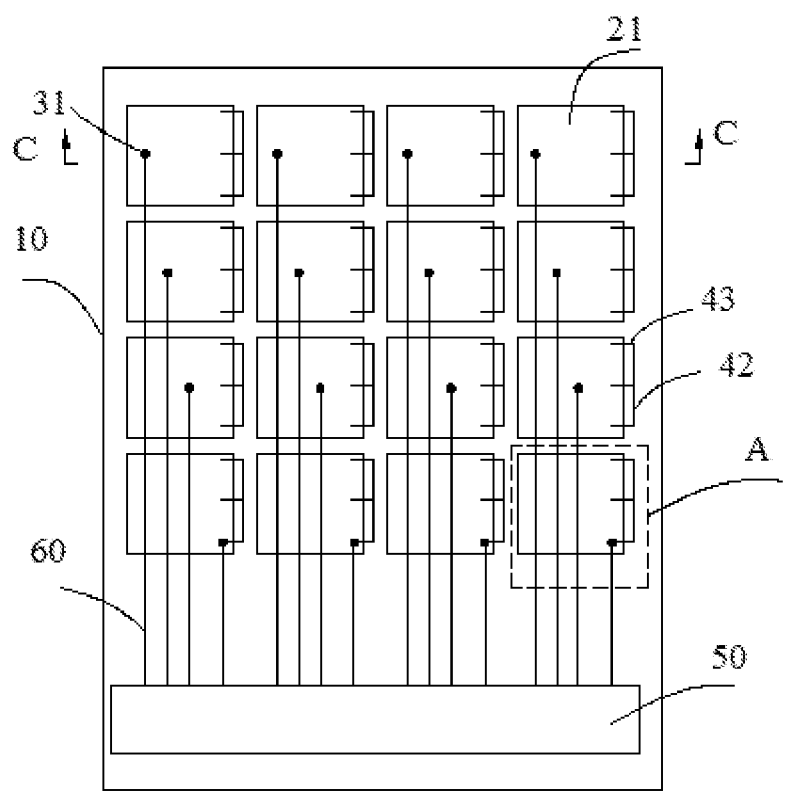
FIG. 1 illustrates the structure of the array substrate of the disclosure.

The description of the technical solution of the embodiment of the disclosure is illustrated clearly and completely by combination of the drawings in the embodiment of the disclosure, obviously, the embodiment is part of the embodiments of the disclosure, not all embodiments. According to the embodiment of the disclosure, the person skilled in the art will obtain others embodiments without any creative efforts, it belongs the scope of the disclosure.

In the description of the disclosure, it need to explain that the term "install", "connection", "link" should be broadly understood, for example, it could be fixed connected, detachably connected, integrally connected; it could be mechanical linked; it could be directly connected, indirectly connected through the intermediary, internal connected between the two elements. The person skilled in the art will specifically understand the concrete means of the terms in the disclosure.

In addition, the description of the disclosure, unless otherwise noted, "a plurality of" means two or more. The term "process" in the specification means not only the independent process, but also includes term of the realization of the expected effect of the process when the processes can not be clearly distinguished. In addition, the number range "~" used in the specification means the range recorded in front and after "~", wherein the minimum and the maximum number are included in the range. In the drawings, the similar or the same structure will use the same symbol.

Figure 2:
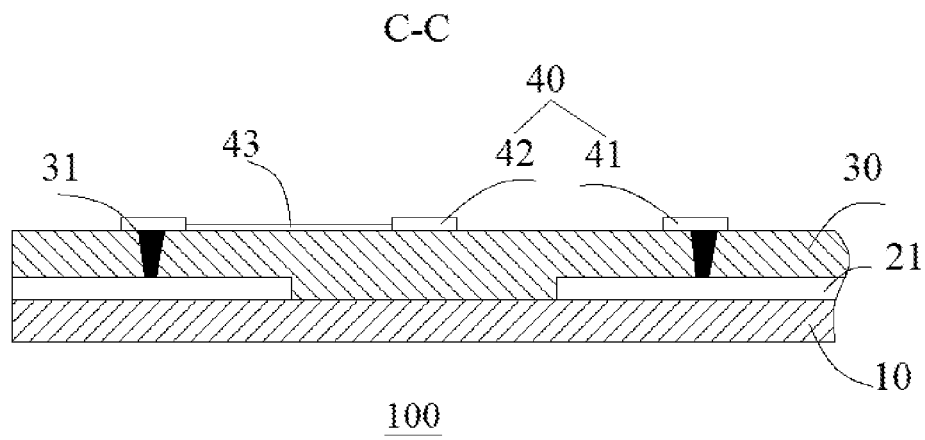
FIG. 2 demonstrates the cross section C-C of the array substrate of FIG. 1.
Figure 3:
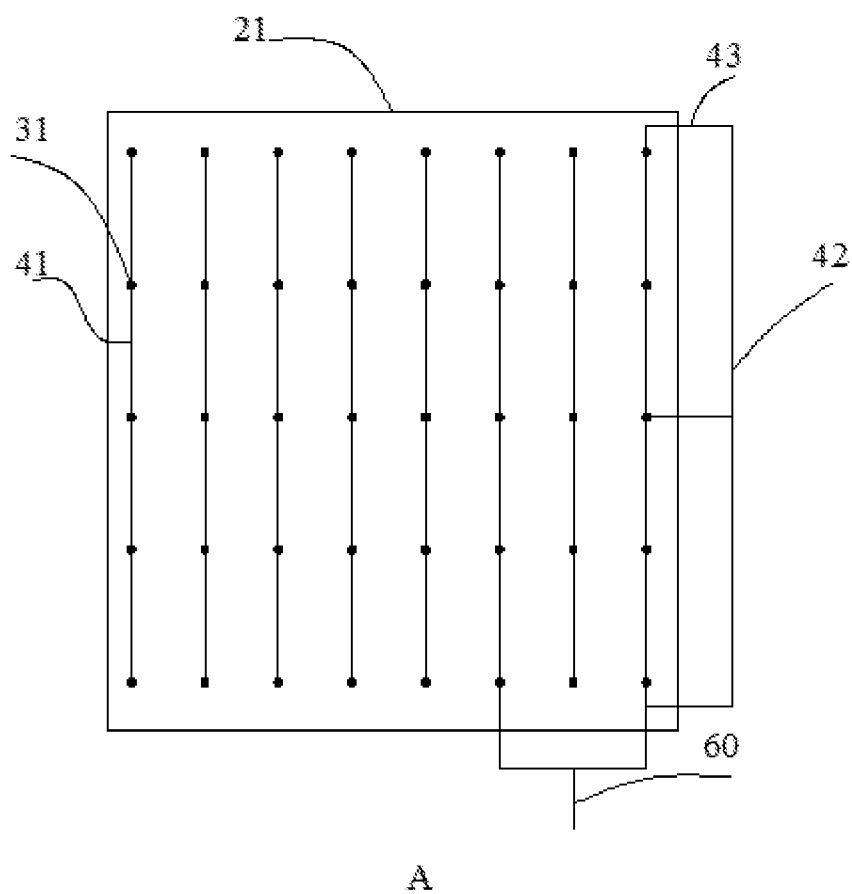
FIG. 3 shows the enlarged drawing of A in FIG. 1.

Referring to FIG. 1~FIG. 3, the array substrate of the disclosure comprises a substrate 10, a common electrode layer (unnumbered in FIG.), insulation layer 30, and sensing layer 40, the common electrode forms on the surface of the substrate 10, the insulation layer 30 coats on the surface of the substrate 10, and covers the common electrode, the sensing layer 40 forming on the surface departed the substrate of the insulation layer 30. The common electrode comprises a plurality of touch electrode 21, the plurality of touch electrode 21 are arranged spatially. The sensing layer 40 comprises a plurality of touch traces 41 and a plurality of suspending traces 42. The touch trace 41 is disposed right on the touch electrode 21. In other words, most of the area of the shadow of the touch trace 41 on the substrate 10 is covered by the touch electrode 21. The touch trace 41 electrically connects to the touch electrode 21 by the through hole 31 is disposed on the insulation layer 30. The suspending trace 42 is disposed above the interval between two touch electrodes 21, the shadow of the suspending trace 42 on the common electrode is on the interval between two touch electrodes 31. The first trace 43 electrically connects the suspending trace 42 and the touch trace 41.

The disclosure uses the method of the electrical connection between the suspending trace and the touch trace, the electrical potentials of the suspending trace 42 and the touch electrode 21 are the same, the difference of the electric field between the interval area of the adjacent touch electrodes and the touch electrode is decreasing. Avoiding the electric field formed in the data line under the touch electrode ingresses into the liquid crystal layer, forming the electric field of the standard direction, driving the liquid crystal to steer, leading to the light leakage at the place, and occurring the vertical linear wavy Mura phenomenon.

To prove the technical effort of the disclosure, we compare two situations in the dialog software that the suspending trace connect to touch sensor (sensor), and the suspending trace not connect to the touch electrode (sensor-f). We got the pixel optical analog result in the dark state, as follows:

| | Simulation results | | |
|---|---|---|---|
| Viewing | Luminance relative value | | |
| angle | sensor | sensor-f | Δsensor |
| 60 | 0.458 | 0.612 | 34% |
| 45 | 0.331 | 0.493 | 49% |
| 30 | 0.268 | 0.425 | 58% |
| 0 | 0.248 | 0.396 | 60% |
| −30 | 0.268 | 0.424 | 58% |
| −45 | 0.331 | 0.492 | 48% |
| −60 | 0.458 | 0.612 | 34% |

Figure 4:
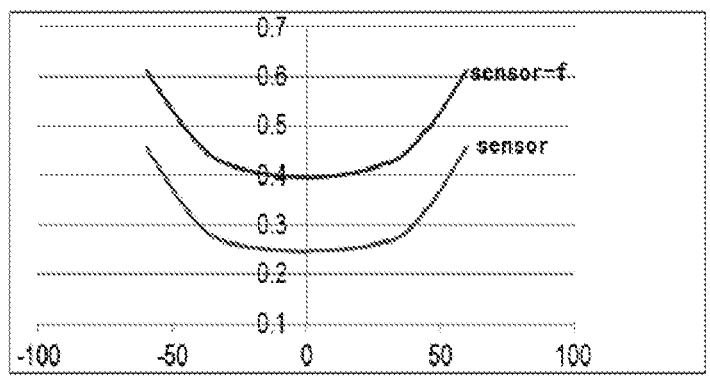
FIG. 4 shows the graph of the simulation experiment.
Figure 5:
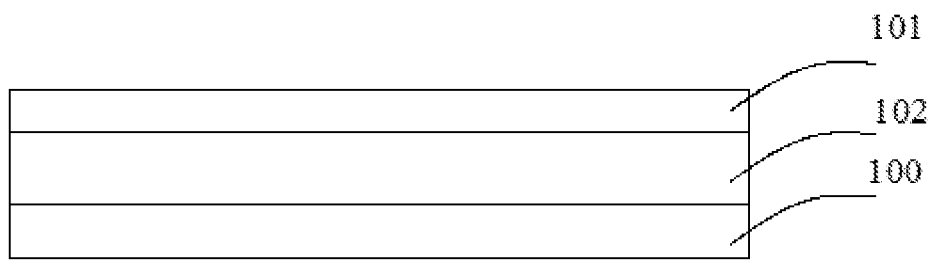
FIG. 5 is the structure diagram of the touch display of the disclosure.

Marking the data of the above table on the axis, and please combine and refer to FIG. 4, the horizontal axis represents viewing angle, the vertical axis represents the light luminance relative value. For example, when the viewing angle is 60 degrees, the luminance relative value when the suspending connects to the touch sensor (sensor) is 0.458; and the luminance relative value when the suspending not connects to the touch sensor (sensor-f) is 0.612. It means that the luminance relative value when the suspending connects to the touch sensor (sensor) is 34% less than the luminance relative value when the suspending not connects to the touch sensor (sensor-f), it can improve the light leakage. It can be understood, no matter what viewing angle, that the luminance of the pixel in the dark state when the suspending not connects to the touch sensor is higher than the luminance of the pixel in the dark state when the suspending connects to the touch sensor. The risk of the optical light leakage is higher. The disclosure effectively reduces the risk of light leakage of the display, and improves the Mura defect when display.

In the embodiment of the disclosure, the plurality of the touch electrode 21 are in matrix arrangement, and each of the touch electrodes 21 is arranged relative to the plurality of the touch traces 41 and the suspending trace 42, the plurality of the touch traces 41 relative to the touch electrode 21 are juxtaposed. The extending directions of the suspending trace 42 and the extending direction of the plurality of the touch electrode 21 relative to the same electrode are the same. In other words, the numbers of the suspending trace 42 and the touch electrode 21 are the same. Preferably, between the plurality of the suspending trace 42 relative to different touch electrode 21 are insulated each other.

An alternative implementation of this embodiment, the suspending trace 42 separates into a plurality of portions, each of the portions of the suspending trace 42 locates between two of the touch electrode 21. This moment, the plurality of portions of the suspending trace 42 can electrically connect to the touch electrode 21 relatively by the second trace 43. It should be noted that the specific pattern of the touch electrode 21 and the suspending trace 42 is set by one self on the basis of the actual situation, there is no limitation in the application.

An embodiment of the disclosure, the array substrate 100 further comprises the touch driving unit 50 and the second trace 60, the second trace 60 is arranged relative to the touch electrode 21, each of the touch electrodes 21 electrically connects the touch driving unit 50 by the second trace 60. Further specifically, in each of the touch electrode 21 relative to the plurality of the touch trace 41, at least two of the touch trace 41 connect in parallel and the touch trace 41 connects to the second trace 60, and connect to the touch driving unit 50 by the second trace 60. It will improve the connection stability and decrease the malfunction of the open of the single touch trace 41 by connect the plurality of touch trace 41 and the second trace 60.

Further, the touch driving unit 50 in the touch period, a pulse signal applies on the touch electrode 21 to sense the finger position by the touch electrode 21. In the display period, the touch electrode 212 can be cover with the common electrode, the touch driving unit 50 supplies the stable voltage signal to the touch trace 41 and the suspending trace 42, makes the liquid crystal steered by the common electrode and the pixel electrode, and enables the display.

An alternative implementation of this embodiment, the touch trace 41, the first trace 43, and the suspending trace 42 use the same material. In the embodiment of the disclosure, the material of the touch trace 41 is transparent conductive material or metal material. Preferably, the material of the touch trace 41 is transparent conductive material, for example, Indium Tin Oxide (ITO), Indium Zinc Oxide (IZO), or the combination of two.

Preferably, the material of the touch electrode 21 is transparent conductive material, for example, Indium Tin Oxide (ITO), Indium Zinc Oxide (IZO), or the combination of two. When making the touch electrode 21, form a conducting layer first by the transparent conductive material described above, and form the electrode patterns on the conducting layer by the etching process. Through the electrode pattern, and get the touch electrode 21.

According to the array substrate 100, the disclosure further provides the touch display 200. In the embodiment, the touch display comprises the array substrate 100 and the color filter substrate 101 relative to the array substrate 100 of any embodiments described above, a liquid crystal layer 102 is disposed between the array substrate 100 and the color filter substrate 101. The color filter layer (no FIG.) disposes on the color filter substrate, and the color filter layer disposes on the color filter substrate 101 faced one side of the liquid crystal layer 102.

According to the touch display 20, the disclosure further provides the electronic device, the electronic device comprises but not limited to the electronic paper, LCD, mobile phone, digital photo frame, tablet, and any product or part with touch display features.

In the description of the specification, the term "one embodiment", "some embodiments", "example", "specific example", "some examples" means the specific feature, structure, material, or characteristic included in at least one of the embodiment or example of the disclosure. In the specification, the term of the above representation is not necessary referring to the same embodiment or example. And the description of the specific feature, structure, material, or characteristic could be combined suitably in one or the plurality of the embodiments or examples.

What is claimed is:

1. An array substrate, comprising a common electrode, an insulation layer, and a sensing layer are sequentially stacked, the common electrode comprises a plurality of touch electrodes, the plurality of the touch electrodes are arranged spatially, the sensing layer comprises a plurality of touch traces and a plurality of suspending traces, one of the touch traces is disposed above the touch electrode and electrically connects to the touch electrode by a through hole, one of the suspending traces is disposed above an interval between two of the touch electrodes and electrically connects to the touch trace by a first trace.

2. The array substrate of claim 1, wherein the plurality of the touch electrodes are arranged in matrix, and each of the touch electrodes is arranged relative to the plurality of touch traces and the suspending trace.

3. The array substrate of claim 2, wherein the plurality of the touch traces, with respect to the same touch electrode, are arranged in parallel to each other, and each of the touch traces is electrically connected to the touch electrode by the plurality of through holes.

4. The array substrate of claim 2, wherein an extending direction of the touch trace and an extending direction of the suspending trace are the same.

5. The array substrate of claim 1, wherein the plurality of the suspending traces are insulated from each other.

6. The array substrate of claim 1, wherein each of the touch electrodes is arranged relative to the plurality of touch traces, and at least two of the touch traces are electrically connected to a second trace.

7. A touch display, comprising an array substrate, the array substrate comprises a common electrode, an insulation layer, and a sensing layer are sequentially stacked, the common electrode comprises a plurality of the touch electrodes, the plurality of the touch electrodes are in spaced arrangement, the sensing layer comprises a plurality of the touch traces and a plurality of the suspending traces, one of the touch traces is disposed above the touch electrode and electrically connects to the touch electrode by a through hole, one of the suspending traces is disposed above an interval between two of the touch electrodes and electrically connects to the touch trace by the first trace.

8. The touch display of claim 7, wherein the plurality of the touch electrodes are arranged in matrix, and each of the touch electrodes is arranged relative to the plurality of the touch traces and the suspending trace.

9. The touch display of claim 8, wherein the plurality of the touch traces, with respect to the same touch electrode, are arranged in parallel to each other, and each of the touch traces is electrically connected to the touch electrode by the plurality of through holes.

10. The touch display of claim 8, wherein an extending direction of the touch trace and an extending direction of the suspending trace are the same.

11. The touch display of claim 7, wherein the plurality of the suspending traces are insulated from each other.

12. The touch display of claim 7, wherein each of the touch electrodes is arranged relative to the plurality of touch traces, and at least two of the touch traces are electrically connected to a second trace.

13. An electronic device, comprising a touch display, the touch display comprising a common electrode, an insulation layer, and a sensing layer are sequentially stacked, the common electrode comprises a plurality of the touch electrodes, the plurality of the touch electrodes are in spaced arrangement, the sensing layer comprises a plurality of the touch traces and a plurality of the suspending traces, one of the touch traces is disposed above the touch electrode and electrically connects to the touch electrode by the through hole, one of the suspending traces is disposed above an interval between two of the touch electrodes and electrically connects to the touch trace by the first trace.

14. The electronic device of claim 13, wherein the plurality of the touch electrodes are arranged in matrix, and each of the touch electrodes is arranged relative to the plurality of the touch traces and the suspending trace.

15. The electronic device of claim 14, wherein the plurality of the touch traces, with respect to the same touch electrode, are arranged in parallel to each other, and each of the touch traces is electrically connected to the touch electrode by the plurality of through holes.

16. The electronic device of claim 14, wherein an extending direction of the touch trace and an extending direction of the suspending trace are the same.

* * * * *